United States Patent
Ellsworth et al.

(10) Patent No.: US 7,761,734 B2
(45) Date of Patent: *Jul. 20, 2010

(54) AUTOMATED FIRMWARE RESTORATION TO A PEER PROGRAMMABLE HARDWARE DEVICE

(75) Inventors: Earle Ellsworth, Benson, AZ (US); Lourdes Magally Gee, Tucson, AZ (US); Jason James Graves, Tucson, AZ (US); Kevan D. Holdaway, Tucson, AZ (US); David Michael Morton, Tucson, AZ (US); Nhu Thanh Nguyen, Tucson, AZ (US); Ivan Ronald Olguin, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 536 days.

This patent is subject to a terminal disclaimer.

(21) Appl. No.: 11/735,295

(22) Filed: Apr. 13, 2007

(65) Prior Publication Data

US 2008/0256525 A1 Oct. 16, 2008

(51) Int. Cl.
*G06F 11/00* (2006.01)
(52) U.S. Cl. .............................. 714/6; 714/15
(58) Field of Classification Search .................. 714/6, 714/15
See application file for complete search history.

(56) References Cited

U.S. PATENT DOCUMENTS

| 5,467,286 | A | | 11/1995 | Pyle et al. | |
|---|---|---|---|---|---|
| 5,793,943 | A | * | 8/1998 | Noll | 714/6 |
| 5,826,075 | A | * | 10/1998 | Bealkowski et al. | 713/187 |
| 5,835,695 | A | * | 11/1998 | Noll | 714/6 |
| 5,901,282 | A | * | 5/1999 | Tanuma | 714/15 |
| 5,925,140 | A | * | 7/1999 | Hudson | 714/52 |
| 5,974,312 | A | | 10/1999 | Hayes, Jr. et al. | |
| 6,009,500 | A | * | 12/1999 | Rossi | 711/162 |
| 6,018,806 | A | * | 1/2000 | Cortopassi et al. | 714/8 |
| 6,055,632 | A | | 4/2000 | Deegan et al. | |
| 6,113,652 | A | | 9/2000 | Lysik et al. | |
| 6,185,696 | B1 | * | 2/2001 | Noll | 714/6 |

(Continued)

FOREIGN PATENT DOCUMENTS

JP 200307591 11/2000

OTHER PUBLICATIONS

B. Holtkamp et al., "A Firmware Monitor to Support Vertical Migration Decisions in the UNIX Operating System", IEEE, 1982, pp. 153-162.

(Continued)

*Primary Examiner*—Robert Beausoliet
*Assistant Examiner*—Joshua P Lottich
(74) *Attorney, Agent, or Firm*—Janaki K. Davida; Konrad Raynes & Victor LLP

(57) ABSTRACT

Provided are techniques for restoring firmware. A first programmable hardware device determines that a second programmable hardware device needs a valid firmware image, retrieves a copy of the valid firmware image from an external memory, and sends the valid firmware image to the second programmable hardware device via a private communication link, wherein the private communication link enables private communication between the first programmable hardware device and the second programmable hardware device. The second programmable hardware device restores existing firmware using the valid firmware image.

22 Claims, 6 Drawing Sheets

U.S. PATENT DOCUMENTS

| | | | |
|---|---|---|---|
| 6,199,194 B1* | 3/2001 | Wang et al. ............... 717/118 |
| 6,240,470 B1* | 5/2001 | Murayama et al. ........... 710/48 |
| 6,247,168 B1 | 6/2001 | Green |
| 6,332,198 B1* | 12/2001 | Simons et al. ................. 714/6 |
| 6,442,067 B1 | 8/2002 | Chawla et al. |
| 6,665,813 B1* | 12/2003 | Forsman et al. .............. 714/15 |
| 6,675,258 B1 | 1/2004 | Bramhall et al. |
| 6,813,571 B2 | 11/2004 | Lightbody et al. |
| 6,836,859 B2 | 12/2004 | Berg et al. |
| 6,907,602 B2* | 6/2005 | Tsai et al. ................... 717/168 |
| 6,944,758 B2* | 9/2005 | Lin ................................ 713/2 |
| 6,957,361 B2* | 10/2005 | Kahler et al. .................. 714/9 |
| 6,983,397 B2* | 1/2006 | Fairhurst et al. ............... 714/9 |
| 7,036,007 B2 | 4/2006 | Schelling et al. |
| 7,080,202 B2 | 7/2006 | Kasako et al. |
| 7,143,275 B2* | 11/2006 | Cepulis et al. ................. 713/1 |
| 7,200,727 B2 | 4/2007 | Kasako et al. |
| 7,203,806 B2 | 4/2007 | Kasako et al. |
| 7,219,201 B2 | 5/2007 | Kasako et al. |
| 7,600,055 B2* | 10/2009 | Douglas et al. .............. 710/19 |
| 7,673,174 B2* | 3/2010 | Swift et al. ................... 714/15 |
| 2002/0046265 A1 | 4/2002 | Suzuki |
| 2002/0087668 A1 | 7/2002 | San Martin et al. |
| 2003/0023906 A1* | 1/2003 | Nishimura et al. ............ 714/39 |
| 2003/0154471 A1 | 8/2003 | Teachman et al. |
| 2003/0237018 A1 | 12/2003 | Baba |
| 2004/0015940 A1 | 1/2004 | Heisey et al. |
| 2004/0030768 A1 | 2/2004 | Krishnamoorthy et al. |
| 2004/0076043 A1* | 4/2004 | Boals et al. ................. 365/200 |
| 2004/0103340 A1* | 5/2004 | Sundareson et al. ............ 714/6 |
| 2004/0103347 A1* | 5/2004 | Sneed et al. .................. 714/32 |
| 2004/0120001 A1* | 6/2004 | Boldon ....................... 358/1.15 |
| 2004/0153738 A1* | 8/2004 | Otaka et al. .................... 714/6 |
| 2004/0197073 A1 | 10/2004 | Oesterreicher et al. |
| 2004/0228063 A1 | 11/2004 | Hawkins et al. |
| 2005/0044314 A1* | 2/2005 | Goodman et al. ........... 711/114 |
| 2005/0081090 A1* | 4/2005 | Lin ................................ 714/6 |
| 2005/0102562 A1* | 5/2005 | Shinohara et al. ............ 714/15 |
| 2005/0108288 A1* | 5/2005 | Hartshorne et al. ......... 707/200 |
| 2005/0138468 A1 | 6/2005 | Asare et al. |
| 2005/0138645 A1* | 6/2005 | Lu .............................. 719/321 |
| 2005/0188170 A1* | 8/2005 | Yamamoto .................. 711/170 |
| 2005/0223372 A1* | 10/2005 | Borchers .................... 717/168 |
| 2006/0005016 A1* | 1/2006 | Lee et al. .................... 713/164 |
| 2006/0069825 A1* | 3/2006 | Hodder ........................ 710/72 |
| 2006/0085564 A1 | 4/2006 | Bomhoff et al. |
| 2006/0095644 A1* | 5/2006 | Fujita et al. ................. 710/313 |
| 2006/0200707 A1* | 9/2006 | Shishido et al. ............. 714/100 |
| 2006/0280150 A1* | 12/2006 | Jha et al. ..................... 370/338 |
| 2006/0282653 A1* | 12/2006 | Chu et al. ....................... 713/1 |
| 2007/0055969 A1* | 3/2007 | Yang .......................... 717/168 |
| 2007/0260775 A1* | 11/2007 | Bita et al. ..................... 710/36 |
| 2008/0027602 A1* | 1/2008 | Yeap et al. ..................... 701/29 |
| 2008/0109647 A1* | 5/2008 | Gavens et al. .................. 713/2 |
| 2008/0109798 A1* | 5/2008 | Gavens et al. ............... 717/168 |
| 2008/0189693 A1* | 8/2008 | Pathak ........................ 717/168 |
| 2008/0235501 A1* | 9/2008 | Bailey et al. ................... 713/1 |
| 2008/0276122 A1* | 11/2008 | Vangeel ......................... 714/6 |

OTHER PUBLICATIONS

D. E. Lowell, et al., "Devirtualizable Virtual Machines Enabling General, Single-Node, Online Maintenance", ACM, 2004, pp. 211-223.

U.S. Patent application entitled "Simultaneous Download to Multiple Targets", U.S. Appl. No. 11/304,407, filed Dec. 14, 2005, IBM Docket No. BEA920050029US1, by inventors D.C. Douglas, J.J. Graves, L. Liu and S.G. Rao.

U.S. Patent application entitled "Automated Firmware Restoration to a Peer Programmable Hardware Device", Serial No. unknown, filed Apr. 13, 2007, IBM Docket No. TUC920060184US2, by inventors E. Ellsworth, L.M. Gee, J.J. Graves, K.D. Holdaway, D.M. Morton, N.T. Nguyen and I.R. Olguin, II.

International Search Report and Written Opinion dated Jun. 20, 2007 for Application No. PCT/EP2006/069438 filed Jul. 12, 2006.

Qian, "Updating BIOS and Firmware on a Group of Servers", May 2002 [online] [retrieved Sep. 7, 2004] from http://www1.us.dell.com/content/topics/global.aspx/power/en/ps2q02_qian?c=us&cs=RC968571&l=en&s=hea>.

PCT International Search Report and Written Opinion dated Aug. 25, 2008 for application No. PCT/EP2008/054434 filed Apr. 11, 2008.

\* cited by examiner

AUTOMATED FIRMWARE RESTORATION TO A PEER PROGRAMMABLE HARDWARE DEVICE

RELATED APPLICATIONS

This application is related to the following commonly assigned and co-pending United States Patent Applications:

Application Ser. No. 11/735,305, filed on Apr. 13, 2007, entitled "AUTOMATED FIRMWARE RESTORATION TO A PEER PROGRAMMABLE HARDWARE DEVICE", by Earle Ellsworth et al., and which is incorporated herein by reference in its entirety; and Application Ser. No. 11/304,407, filed on Dec. 14, 2005, entitled "SIMULTANEOUS DOWNLOAD TO MULTIPLE TARGETS", with and which is incorporated herein by reference in its entirety.

BACKGROUND

1. Field

Embodiments of the invention relate to automated firmware restoration to a peer programmable hardware device.

2. Description of the Related Art

Programmable hardware devices (e.g., a Small Computer System Interface (SCSI) Enclosure Services (SES) processor in a storage server or a Universal Serial Bus (USB) controller for a USB device) are found in many different types of systems. In some cases, the purpose of the programmable hardware device is to provide reliability, availability, or serviceability (RAS) features. However, occasionally a programmable hardware device may require an update to the firmware that is driving its operation. Firmware may be described as programming that is a permanent part of a device (e.g., by being inserted into Programmable Read-Only Memory (PROM)). Also, firmware may be described as programming that is running on the programmable hardware device, whereas a firmware image may be described as the set of data that comprises the firmware that gets loaded onto the programmable hardware device. In many cases, the firmware that is written to the programmable hardware device will overwrite the previously operating firmware. Thus, if corrupt firmware (i.e., in the form of a firmware image) is written to the programmable hardware device, the programmable hardware device will not operate and, thus, can no longer provide normal functionality. A programmable hardware device with corrupt firmware (i.e., with a corrupt firmware image) may be referred to as a corrupted programmable hardware device. Firmware that is corrupted may be described as corrupted firmware or invalid firmware.

An alternative condition that occasionally may occur is that the firmware runs into an error during normal operation (e.g., when a firmware image download is not occurring or at runtime), and the error corrupts the firmware image, thus, also preventing the programmable hardware device from providing normal functionality.

Typically, system devices that fail in some way negatively affect the overall performance of the system, which in most customer environments is not acceptable. Typically, the conventional means to fix the problem is to replace the programmable hardware device or, if possible, reinstall the firmware image. However, these fixes require intervention from some type of external support, and this type of intervention is not automatic. If a customer had critical operations that were negatively affected by any delays, the existing solution of calling and waiting for support would not be adequate.

Thus, there is a need in the art to enable automatic self correction of a firmware problem for a programmable hardware device.

SUMMARY OF EMBODIMENTS OF THE INVENTION

Provided are a method and computer program product for restoring firmware. A first programmable hardware device determines that a second programmable hardware device needs a valid firmware image, retrieves a copy of the valid firmware image from an external memory, and sends the valid firmware image to the second programmable hardware device via a private communication link, wherein the private communication link enables private communication between the first programmable hardware device and the second programmable hardware device. The second programmable hardware device restores existing firmware using the valid firmware image.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide an automated firmware restoration to a programmable hardware device that either has a redundant partner, has a shared external memory with another processor, or is linked to another processor that maintains a copy of a valid firmware image for the programmable hardware device. In certain embodiments, there are two redundant devices and any firmware update on one of the devices may be corrected by the other device, provided the failing device is capable of receiving updates and a communication interface is functioning between the two devices. Firmware update may be described as update of the firmware image. In certain embodiments, there are two processors that are not redundant, but the corrupted processor has a functioning communication interface to the other processor, and this other processor either has access to an external memory of the corrupted processor that contains a copy of the firmware image of the corrupted processor or maintains a copy of the firmware image of the corrupted processor in some storage (e.g., the firmware image is sent to the processor during a firmware update for storage purposes). Embodiments are also applicable to a condition separate from a firmware update where the processor encounters some type of error that corrupts the firmware image during normal operation and either the processor detects the failure during normal operation or upon reboot.

Merely to enhance understanding, an explanation of embodiments applicable to firmware update are provided. However, embodiments are also applicable to conditions in which a firmware image is corrupted in normal operation.

Figure 1:
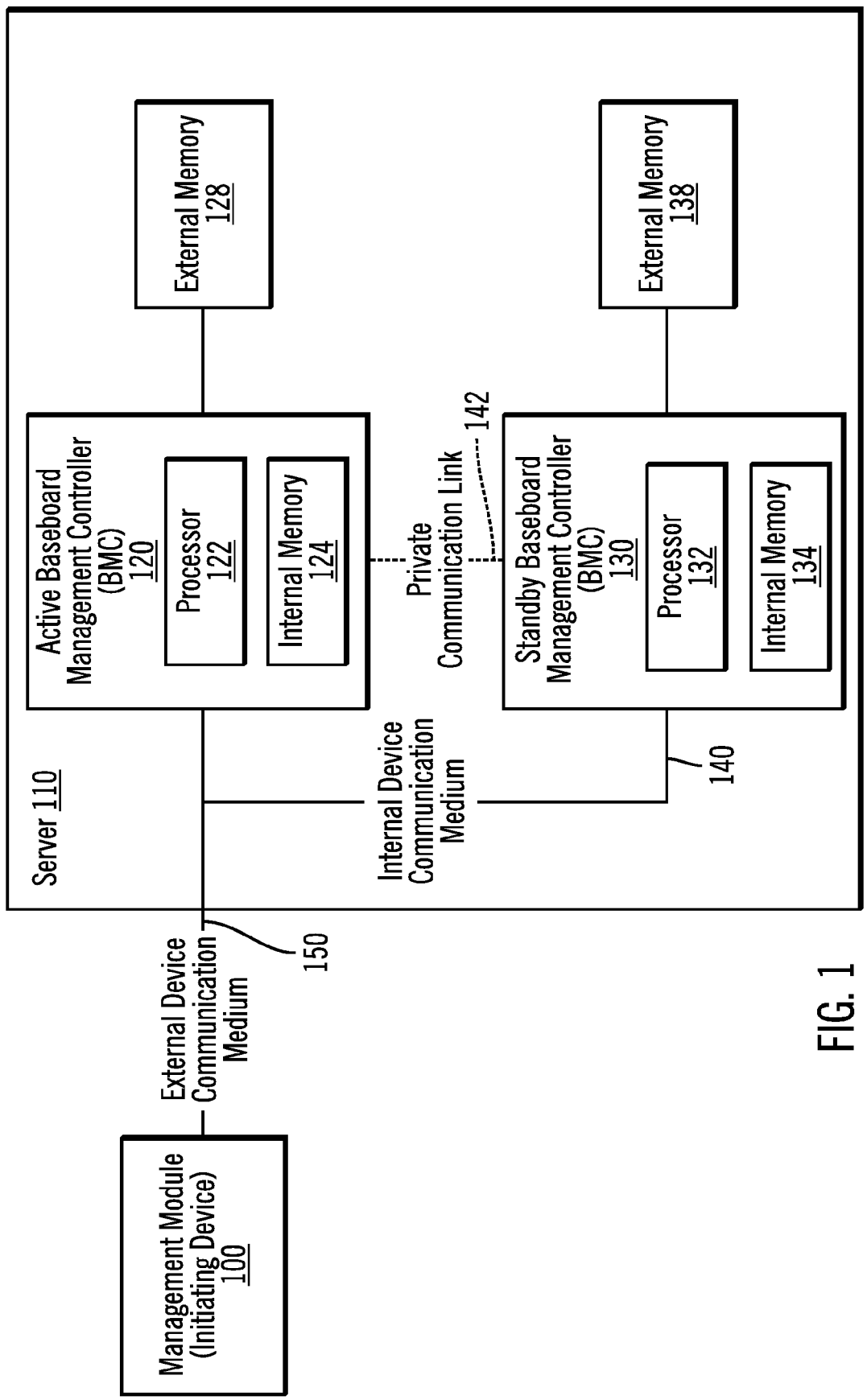
FIG. 1 illustrates details of two redundant devices in accordance with certain embodiments of the present invention.

FIG. 1 illustrates details of two redundant devices in accordance with certain embodiments of the present invention. In FIG. 1, a Management Module (MM) 100 is an initiating device and is connected via an external device communication medium 150 to a server 110. The server 110 includes active Baseboard Management Controller (BMC) 120 and standby Baseboard Management Controller (BMC) 130. The active and standby BMCs 120, 130 provide management capabilities to local resources and redundant management capabilities to shared resources.

The active BMC 120 includes processor 122 and internal memory 124. The standby BMC includes processor 132 and internal memory 134.

In FIG. 1, the active and standby BMCs 120, 130 are programmable hardware devices that are redundant. The active BMC 120 and standby BMC 130 may also be referred to as first and second target devices, respectively, or as partner BMCs. The active and standby BMCs 120, 130 may be described as dual BMCs for redundancy purposes to improve the overall server 110 reliability, however there are local components that each BMC 120, 130 individually controls that are not protected by redundancy (e.g., one BMC 120, 130 is not able to power components directly controlled by the partner BMC 120, 130). The BMCs 120, 130 have an internal private communication link 142 between them along with an external memory 128, 138 dedicated to each BMC 120, 130. Using these components 142, 128, 138, embodiments enable automatic firmware correction.

The active BMC 120 and the standby BMC 130 are able to communicate over the private communication link 142. The private communication link 142 may be described as a private device communication medium that enables private communication between the active and standby BMCs 120, 130. The management module 100 is not able to send communications directly on the private communication link 142. An internal device communication medium 140 is coupled to the external device communication medium 150. In certain embodiments, the external device communication medium 150 may be a bus (e.g., a RS485 serial bus inter-integrated circuit (I2C) bus, a Dual Port RAM (DPRAM), or other bus-based media), and the internal device communication medium 140 may be a bus (e.g., an internal RS485 serial bus, inter-integrated circuit (I2C) bus, a Dual Port RAM (DPRAM), or other bus-based media) connected to the external device communication medium 150.

In normal operation, the management module 100 sends a single firmware image (through multiple packets) to both of the active and standby BMCs 120, 130 by issuing the firmware image over a single external device communication medium 150. Each BMC 120, 130 in the normal update process writes the firmware image directly to an internal memory 124, 134 (e.g., an internal flash area) that stores the BMC instruction set that drives the processor 122, 132. In the event that the firmware image is corrupt, each BMC 120, 130 has the limited capability to wait for a new firmware update through a set of reduced functionality provided in code that is not updated in the firmware update process (i.e., code that is stored in what is referred to as a boot block). However, normal functions of the BMC 120, 130 can no longer be provided when the firmware image is corrupt. In server 110, this may be a problem because each BMC 120, 130 controls system power in the server 110. So, if the server 110 is powered down for a firmware update and the update fails (i.e., the firmware image is corrupt), the server 110 is not able to power on until a valid firmware update is provided, meaning a customer would lose usability of the blade server. A "valid" firmware update may be described as one that is not corrupted and enables the BMC 120, 130 to start up perform its functionality correctly. An example result of corrupted firmware is a situation in which the firmware update completes successfully, and the BMC 120, 130 starts up as normal, but then some of its normal functionality is inhibited by the new, corrupted firmware. Even though there is a second BMC 120, 130, in the event of a firmware failure, the second BMC 120, 130 is not able to power components directly controlled by the partner BMC 120, 130, which underscores the importance of both BMCs 120, 130 being in an operational state.

With embodiments, the active BMC 120 is coupled to an external memory 128 in which the active BMC 120 stores a copy of the firmware image. The standby BMC 130 is coupled to an external memory 138 in which the standby BMC 130 stores a copy of the firmware image. In the case of redundant devices, each redundant device runs the same firmware. Therefore, the copies of the firmware images in the external memories 128, 138 are the same. With these copies, if one of the BMCs 120, 130 has firmware that is corrupt, the other BMC 120, 130 is able to provide a corresponding firmware image from the external memory 128, 138.

In certain embodiments, the server 110 is a blade server in an IBM® BladeCenter® chassis (available from International Business Machines Corporation), where the blade server has dual baseboard management controllers (BMCs). The blade server may be described as an midrange server class storage system. However, embodiments are applicable to any set of target devices (e.g., redundant devices, such as the active and standby BMCs 120, 130), may use any shared communication medium (e.g., internal device communication medium 140) between the target devices that permits "snooping" in data sniffing mode, and may use any private device communication medium (e.g., private communication link 142) between the redundant target devices. Data sniffing mode (also referred to as "promiscuous" mode) may be described as a mode in which a target device intercepts and reads each communication (e.g., network packet) that arrives in its entirety, whether or not the communication is addressed to that target device. Embodiments may be used in networks that are serial or non-serial. Although examples herein may refer to firmware update, embodiments are applicable to software updates. Also, there may be any number of devices that receive the update over a same device communication medium. The active and standby BMCs 120, 130 may be described as control entities in the blade server used by an IBM® BladeCenter® Management Module (MM).

During normal operation, one BMC (e.g., the active BMC 120) is said to "own" the external device communication medium 150, and so one BMC is capable of communicating with the management module 100 at a time. Although the management module 100 is aware of sending commands to the active BMC 120, the management module 100 does not speak directly to the active BMC 120. Instead, the management module 100 sends messages to an address on the external device communication medium 150 that is associated with the server 110 slot, and the active and standby BMCs 120, 130 are capable of responding to and/or listening on this address. Therefore, from the management module 100 perspective, the management module is speaking to one BMC at any moment in time. In certain embodiments of the dual BMCs 120, 130 in a server 110, there is no hardware inhibitor that prevents both BMCs from actively using the external device communication medium 150 (where the standby BMC 130 may access the external device communication medium 150 via the internal device communication medium 140). In certain embodiments, however, the external device communication medium 150 is actively used by a default BMC that is defined as the active BMC 120, and the other BMC 130 remains in an inactive state with the internal device communication medium 140 until the active BMC 120 that is actively using the external device communication medium 150 fails.

Figure 2:
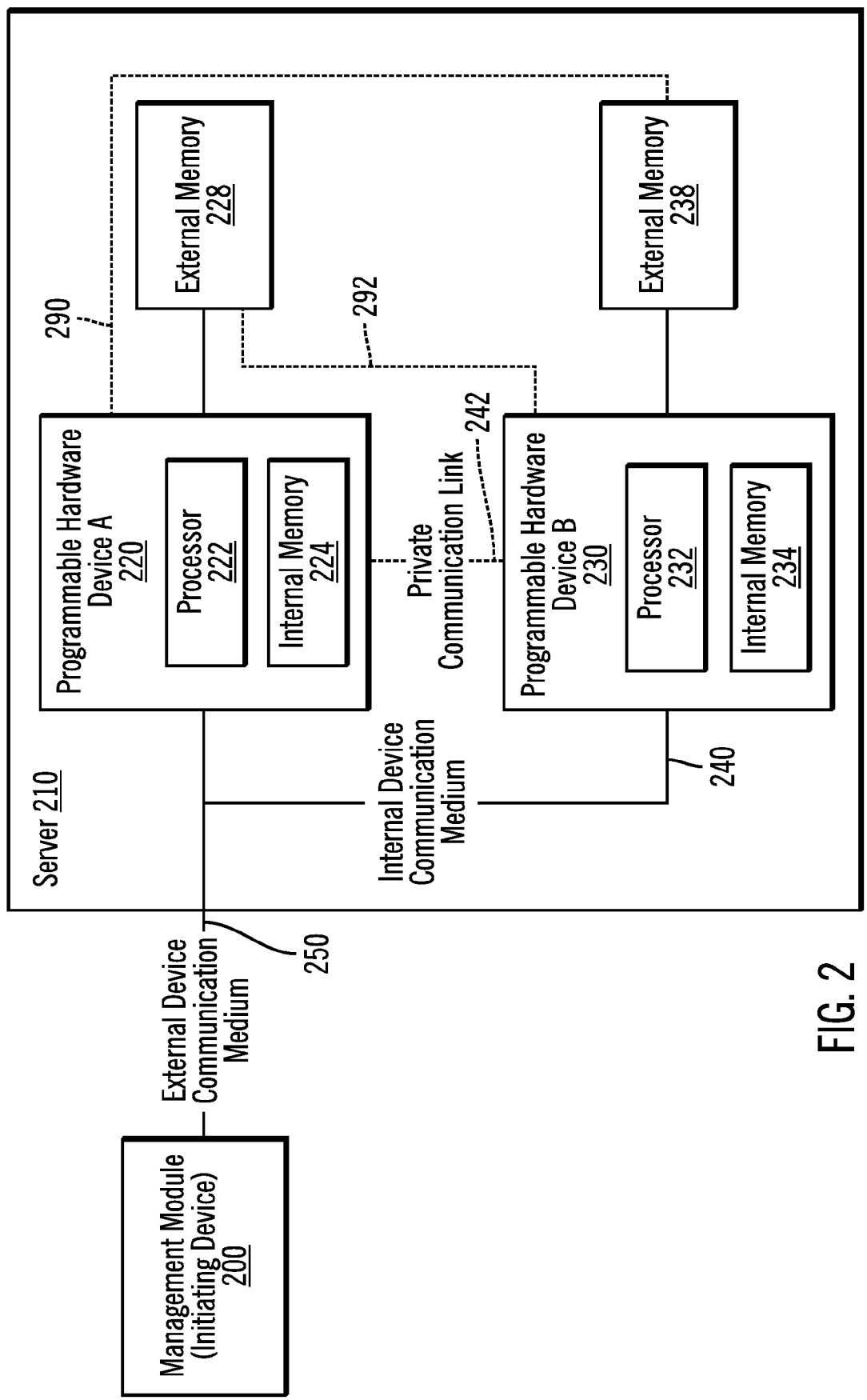
FIG. 2 illustrates details of two programmable hardware devices that are not redundant in accordance with certain embodiments of the present invention.

FIG. 2 illustrates details of two programmable hardware devices that are not redundant in accordance with certain embodiments of the present invention. In FIG. 2, a Management Module (MM) 200 is an initiating device and is connected via an external device communication medium 250 to a server 210. The server 210 includes programmable hardware device A 220 and programmable hardware device B 230. The programmable hardware device A 220 includes processor 222 and internal memory 224. The programmable hardware device B includes processor 232 and internal memory 234.

In FIG. 2, the programmable hardware devices 220, 230 may also be referred to as partners. The programmable hardware devices 220, 230 have an internal private communication link 242 between them, and each programmable hardware device 220, 230 has an external memory 228, 238. Dashed line 290 indicates that programmable hardware device A 220 is optionally coupled to external memory 238, while dashed line 292 indicates that programmable hardware device B 230 is optionally coupled to external memory 228. In this manner either external memory 228, 238 or both external memories 228, 238 may function as a shared external memory. In certain embodiments, the external memory 228, 238 is dedicated to one programmable hardware device 220, 230 and accessible by the other programmable hardware device 220, 230. With the embodiments illustrated in FIG. 2, the programmable hardware devices 220, 230 do not use the same firmware, but each is able to access a copy of the other programmable hardware device 220, 230 firmware image (e.g., either from its own external memory 228, 238 or from the other programmable hardware device's external memory 228, 238). Then, If one programmable hardware device 220, 230 fails due to firmware being corrupt, then the other programmable hardware device 220, 230 is able to provide a valid firmware image.

Although embodiments refer to an external memory 128, 138, 228, 238, any storage space external to the programmable hardware device 120, 130, 220, 230 may be used as long as the storage space is non-volatile or in some way protects the contents such that the firmware in the memory is not lost (e.g., during a power off phase).

In FIG. 2, an internal device communication medium 240 is coupled to the external device communication medium 250. In certain embodiments, the external device communication medium 250 may be a bus (e.g., a RS485 serial bus inter-integrated circuit (I2C) bus, a Dual Port RAM (DPRAM), or other bus-based media), and the internal device communication medium 240 may be a bus (e.g., an internal RS485 serial bus, inter-integrated circuit (I2C) bus, a Dual Port RAM (DPRAM), or other bus-based media) connected to the external device communication medium 250.

Figure 3:
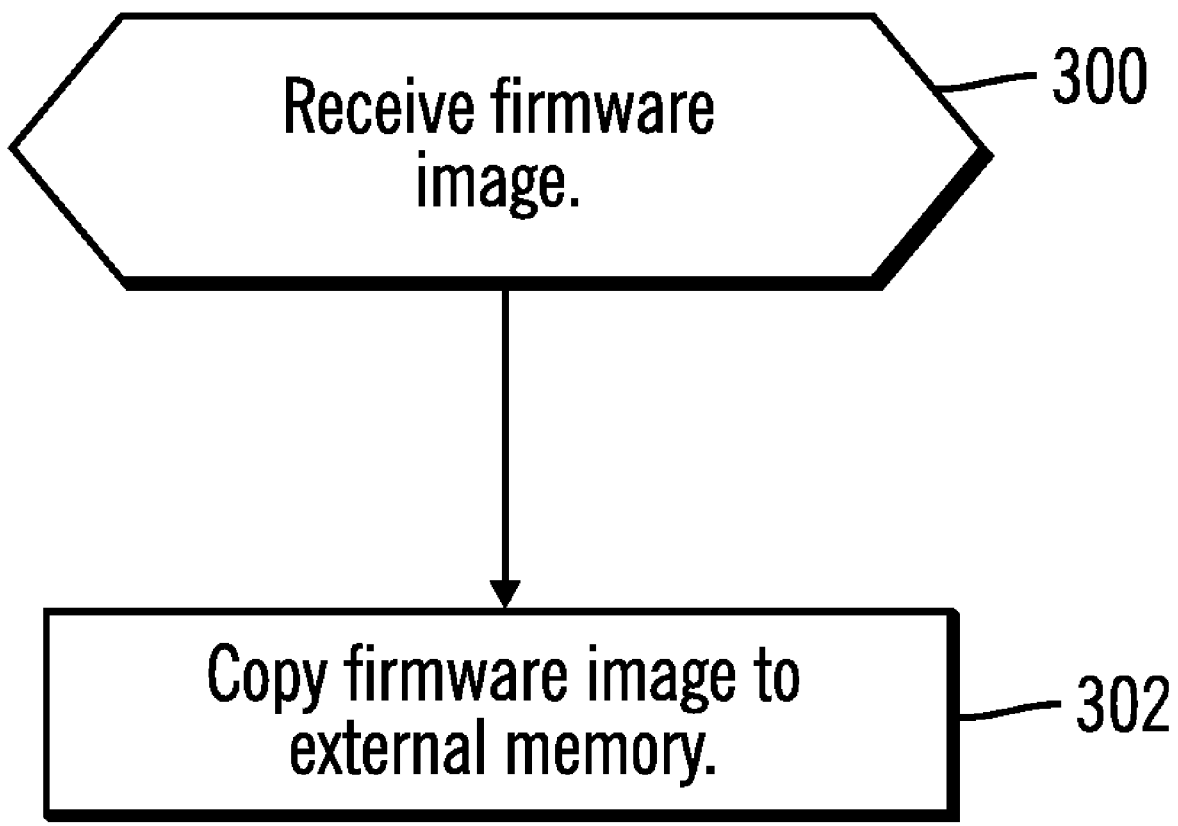
FIG. 3 illustrates logic performed by each programmable hardware device in response to receiving a firmware image in accordance with certain embodiments.

With embodiments, each programmable hardware device (e.g., BMC 120, 130 or devices 220, 230) makes use of the new hardware component connected to that programmable hardware device, the external memory. FIG. 3 illustrates logic performed by each programmable hardware device 120, 130, 220, 230 in response to receiving a firmware image in accordance with certain embodiments. Control beings at block 300 with a programmable hardware device 120, 130, 220, 230 receiving a firmware image (i.e., a new firmware image that may either be the first firmware image received or that may be an update to previously received firmware image). In block 302, the programmable hardware device 120, 130, 220, 230 stores the firmware image in external memory. Each external memory 128, 138, 228, 238 is large enough to hold multiple copies of a firmware image (e.g., multiple versions, which enables a programmable hardware device 120, 130, 220, 230 to obtain a particular version of the firmware image). In certain embodiments, the number of copies is determined by how many copies the memory supports, while in other embodiments, other factors may be used in addition to or instead of memory size.

In particular, during normal firmware operations, each BMC 120, 130 copies the firmware image to an area in the external memory 128, 138. Each BMC 120, 130 keeps two or more copies. For non-redundant programmable hardware devices 220, 230 that do share one or more external memories 228, 238, each programmable hardware device 220, 230 may store a copy of its firmware image in the shared external memory 228, 238. On the other hand, for non-redundant programmable hardware devices 220, 230 that do not share one or more external memories 228, 238, each programmable hardware device 220, 230 receives a copy of the firmware image of the other programmable hardware device 220, 230 and stores that copy in its own external memory 228, 238.

Figure 4:
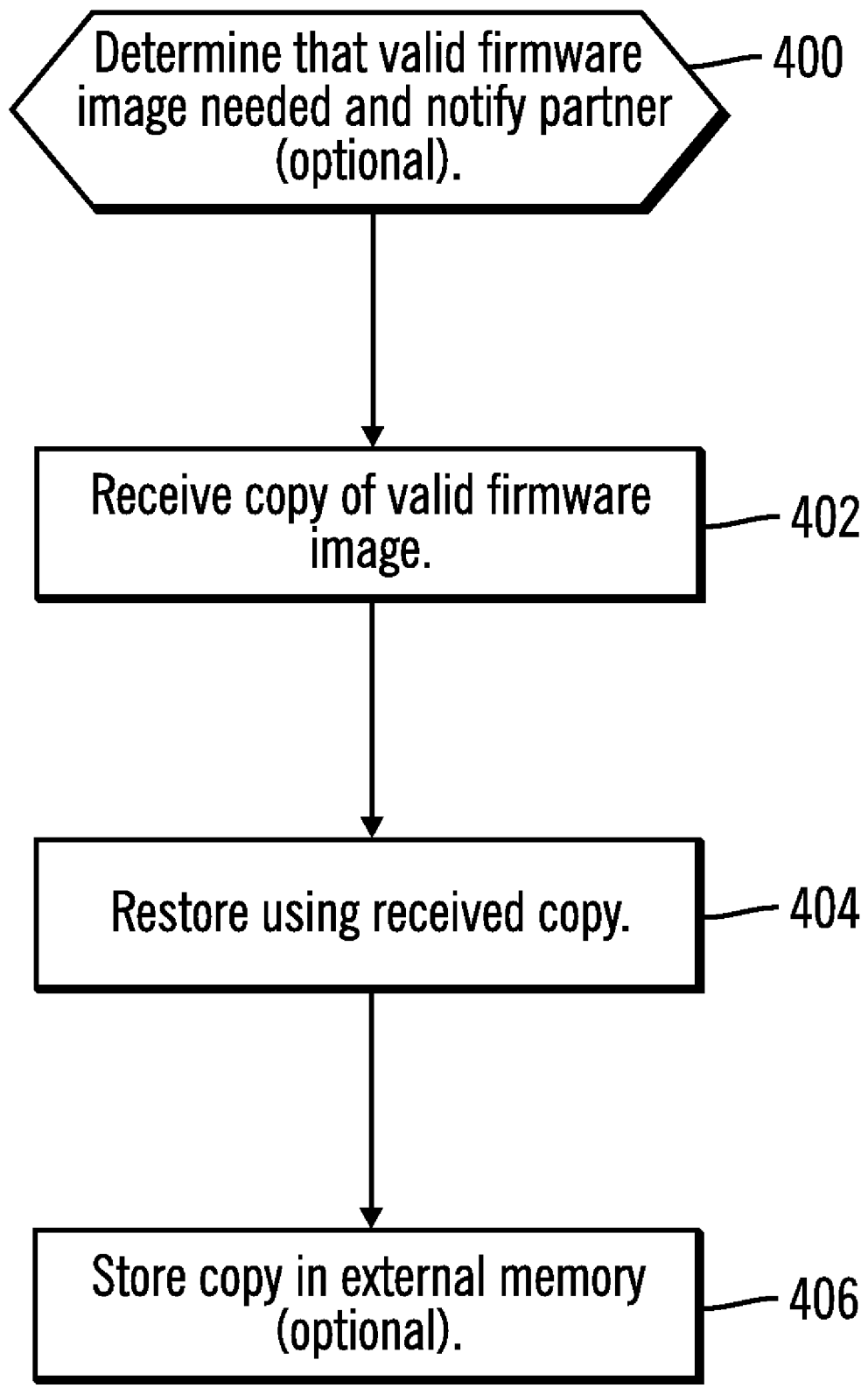
FIG. 4 illustrates logic performed by a programmable hardware device that fails in accordance with certain embodiments.

FIG. 4 illustrates logic performed by a programmable hardware device 120, 130, 220, 230 that fails in accordance with certain embodiments. Control begins at block 400 with the programmable hardware device 120, 130, 220, 230 optionally determining that a valid firmware image is needed and notifying a partner. In certain embodiments, rather than the programmable hardware device 120, 130, 220, 230 notifying the partner, the partner automatically detects the failure and sends a valid firmware image. In block 402, the programmable hardware device 120, 130, 220, 230 receives a copy of the valid firmware image. In certain embodiments, the programmable hardware device 120, 130, 220, 230 receives the copy from the partner. In certain alternative embodiments, the programmable hardware device 120, 130, 220, 230 obtains a copy of the valid firmware image from its external memory 128, 138, 228, 238. In block 406, the programmable hardware device 120, 130, 220, 230 is restored using the received copy of the valid firmware image. In block 406, the programmable hardware device 120, 130, 220, 230 optionally stores a copy of the valid firmware image in its external memory 128, 138, 228, 238 (e.g., if the firmware image was not retrieved from its own external memory 128, 138, 228, 238).

Figure 5:
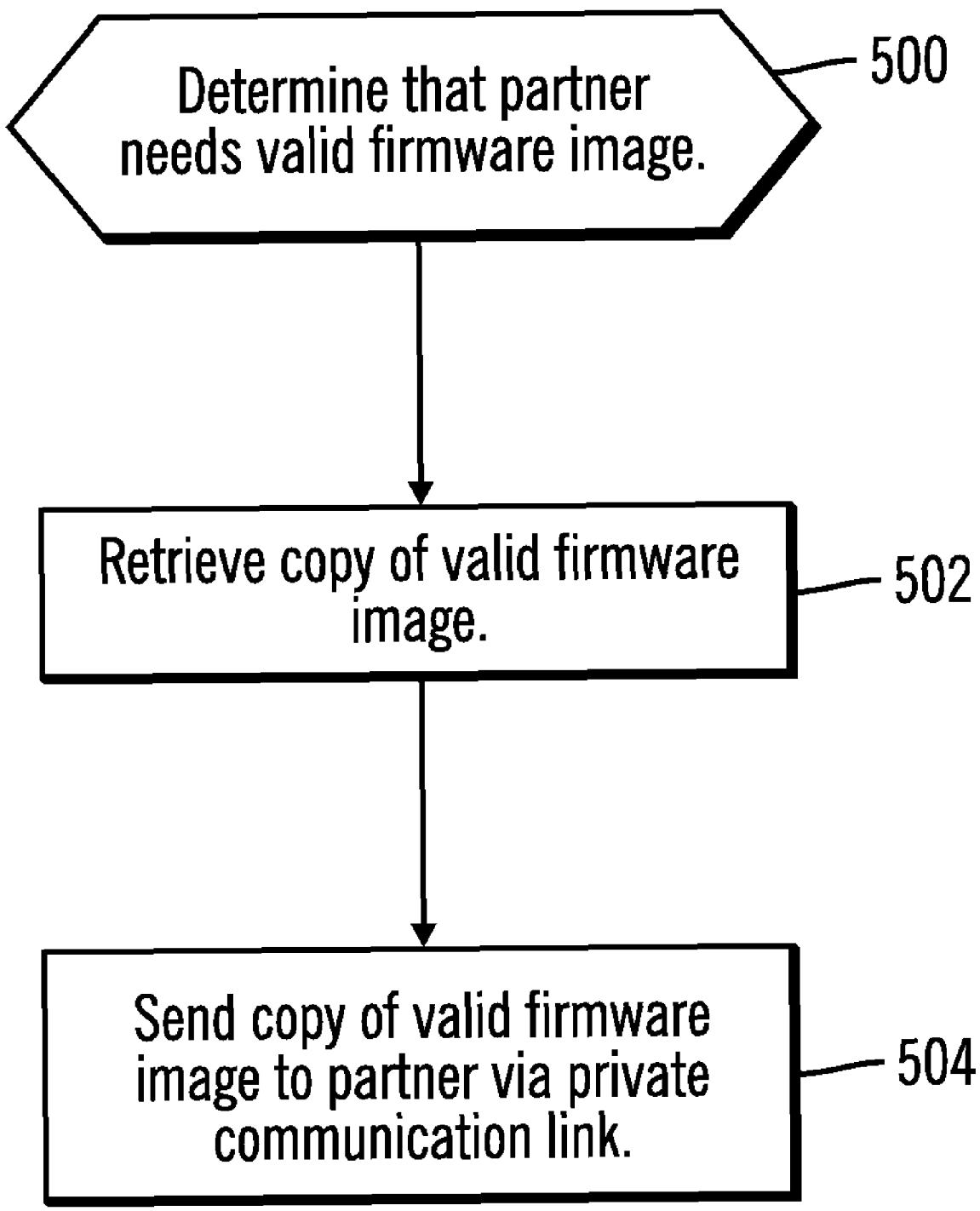
FIG. 5 illustrates logic performed by a programmable hardware device when a partner fails in accordance with certain embodiments.

FIG. 5 illustrates logic performed by a programmable hardware device 120, 130, 220, 230 when a partner fails in accordance with certain embodiments. Control begins at block 500 with the programmable hardware device 120, 130, 220, 230 determining that the partner needs a valid firmware image. The determination may be made by the programmable hardware device 120, 130, 220, 230 automatically or the programmable hardware device 120, 130, 220, 230 may receive an indication of failure from the partner. In block 502, the programmable hardware device 120, 130, 220, 230 retrieves a copy of the valid firmware image from the external memory 128, 138, 228, 238. In various embodiments, the copy of the valid firmware image may be retrieved from an external memory dedicated to the programmable hardware device 120, 130, 220, 230 or from a shared external memory. In block 504, the programmable hardware device 120, 130, 220, 230 sends a copy of the valid firmware image to the partner via the private communication link 142, 242.

With reference to FIG. 1 and embodiments in which there are two redundant devices, in the event of a corrupt firmware image being passed from the management module 100 to the BMC 120, 130, since one BMC 120, 130 is updated at a time, the firmware update process may fail without actions performed in accordance with embodiments. In certain embodiments, the corrupted BMC 120, 130 directly accesses its external memory 128, 138 for a copy of a firmware image to update itself. In certain embodiments, if the BMC 120, 130 does not find a valid firmware image in the external memory 120, 130 or if the corrupted BMC 120, 130 is designed to provide an indication to a partner, the corrupted BMC 120, 130 provides an indication to the partner BMC 120, 130 that a valid firmware image is needed. The partner BMC 120, 130 is in a position to rollback the firmware of the corrupted BMC 120, 130 by providing the corrupted BMC 120, 130 with the last valid firmware image in its external memory 128, 138 or by directly reading its own firmware image and providing that to the other BMC 120, 130 via the private communication link 142. The operating BMC 120, 130 acts as the management module that initiates the firmware update process and updates the partner BMC 120, 130 that was corrupted. Control to initiate a firmware update of a BMC 120, 130 may be placed in the valid partner's domain with a heartbeat mechanism. A heartbeat mechanism may be described as one in which a programmable hardware device 120, 130, 220, 230 periodically sends a message to a partner and receives a message from the partner to determine whether the partner is still functioning. For example, when a programmable hardware device 120, 130, 220, 230 does not respond to the heartbeat function message within a predetermined period of time, the partner programmable hardware device 120, 130, 220, 230 determines that the programmable hardware device 120, 130, 220, 230 has failed and needs a valid firmware image. Thus, upon completion, both BMCs are able to operate again in a redundant fashion.

With reference to FIG. 2 and embodiments in which the devices are not redundant, a shared external memory 228, 238 may be available between processors 222, 232 or both processors 22Z, 232 may maintain the partner's firmware image in separate dedicated external memories 228, 238. The processors 222, 232 do not have to be redundant but have a functioning communication interface (e.g., private communication link 242). In various embodiments, either each processor 222, 232 implements a heartbeat function during normal operation or the corrupted processor 222, 232 indicate a failure to the partner processor 222, 232. For firmware updates, the heartbeat mechanism stops temporarily, since the processor 222, 232 being updated is not in a position to handle that functionality (i.e., because, typically, the functionality is in operational code that cannot be accessed during a firmware update). However, a timeout may be implemented that expires if the heartbeat mechanism was not started in time (i.e., the timeout may be defined as the longest time allowable for a firmware update for the partner processor). In the event of a timeout, the partner processor 222, 232 automatically retrieves a firmware image from external memory 228, 238 to update the corrupted processor 222, 232. In certain embodiments, the corrupted processor 222, 232 requests and receives a firmware image of the last version of firmware that is usable from the partner processor 222, 232. The firmware image may be provided over the private communication link 242 between the processors 222, 232 or, alternatively, the corrupted processor's internal memory 224, 234 (e.g., an internal flash area) may be directly updated if the partner processor 222, 232 has the ability to directly update the internal memory 224, 234 by writing directly to a utility that updates a processor's internal memory 224, 234 such as a Joint Test Action Group (JTAG) interface. Upon completion, the corrupted processor has a valid firmware image.

Using these embodiments, a programmable hardware device 120, 130, 220, 230 that receives a corrupt firmware image is automatically restored with a valid firmware image. With embodiments, when the programmable hardware device 120, 130, 220, 230 encounters an error during normal operation that corrupts its firmware or firmware image, the programmable hardware device 120, 130, 220, 230 is able to be restored using a valid firmware image from its own external memory 128, 138, 228, 238 or from a partner 120, 130, 220, 230. An example of a condition that could corrupt a firmware image during normal operation is an invalid memory access that causes the firmware to execute invalid code or access garbage data. In this case, if the programmable hardware device 120, 130, 220, 230 has the capability to identify that it is in a corrupt state during normal operation, the programmable hardware device 120, 130, 220, 230 is able to be restored with a valid firmware image. Also, if the programmable hardware device 120, 130, 220, 230 reboots because of a timeout (e.g., a timeout of a watchdog timer), and, during its initialization, the programmable hardware device 120, 130, 220, 230 identifies that there was a problem, the programmable hardware device 120, 130, 220, 230 is able to halt normal boot up to obtain a valid firmware image. A watchdog timer may be described as a timer that is to be periodically reset by hardware, and, if the timer is not reset, the system enters a failure state.

Thus, with embodiments a corrupted programmable hardware device 120, 130, 220, 230 is able to obtain a valid firmware image from a partner programmable hardware device 120, 130, 220, 230 and operate with the valid firmware image.

The corrupt firmware image may be restored during firmware update or during normal operation. Embodiments enable rolling back to a valid firmware image. Embodiments also provide a heartbeat mechanism to detect failure of a partner 120, 130, 220, 230 during normal operation.

ADDITIONAL EMBODIMENT DETAILS

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PCA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3, 4 and 5 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3, 4, and 5 may be implemented in software, hardware, programmable and non-programmable gate array logic or in some combination of hardware, software, or gate array logic.

Figure 6:
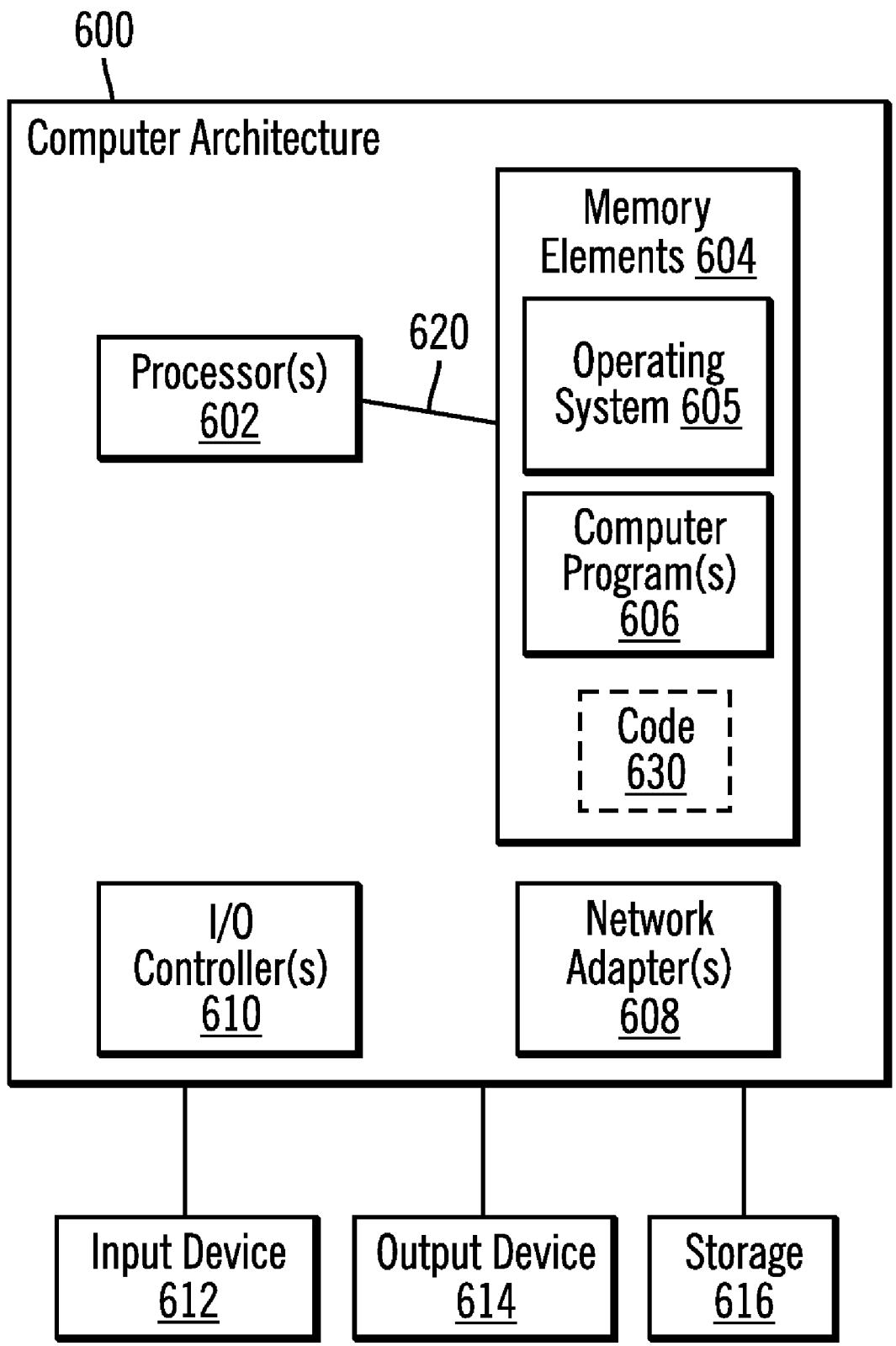
FIG. 6 illustrates a system architecture that may be used in accordance with certain embodiments.

FIG. 6 illustrates a system architecture 600 that may be used in accordance with certain embodiments. Client computer 100 and/or server computer 120 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606. The memory elements 604 may also include code 630 that implements some or all of the described operations taught by embodiments of the invention. Although code 630 is shown, the described operations taught by embodiments of the invention may alternatively be implemented in hardware or in a combination of hardware and software.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for restoring firmware, comprising:
    under control of a first programmable hardware device in a server,
        periodically determining whether a second programmable hardware device in the server needs a valid firmware image; and in response to determining that the second programmable hardware device needs the valid firmware image,
retrieving a copy of the valid firmware image for the second programmable hardware device; and
sending the valid firmware image to the second programmable hardware device via a private communication link, wherein the private communication link enables private communication between the first programmable hardware device and the second programmable hardware device; and
under control of the second programmable hardware device,
in response to receiving the valid firmware image from the first programmable storage device, restoring existing firmware using the valid firmware image;
periodically determining whether the first programmable hardware device needs a valid firmware image; and
in response to determining that the first programmable hardware device needs the valid firmware image,
retrieving a copy of the valid firmware image for the first programmable hardware device; and
sending the valid firmware image to the first programmable hardware device via the private communication link.

2. The method of claim 1, wherein the first programmable hardware device retrieves the valid firmware image from an external memory that is dedicated to the first programmable hardware device.

3. The method of claim 1, wherein the first programmable hardware device and the second programmable hardware device share an external memory storing the valid firmware image.

4. The method of claim 1, wherein the second programmable hardware device retrieves the valid firmware image from an external memory that is dedicated to the second programmable hardware device.

5. The method of claim 1, wherein the first programmable hardware device and the second programmable hardware device are redundant and use a same firmware.

6. The method of claim 1, wherein the first programmable hardware device and the second programmable hardware device are not redundant and use different firmware.

7. The method of claim 1, wherein determining whether the second programmable hardware device needs the valid firmware image further comprises:
using a heartbeat function to periodically send a heartbeat function message to the second programmable hardware device to determine whether the second programmable hardware device is functioning, wherein, when the second programmable hardware device does not respond to the heartbeat function message from the first programmable hardware device within a predetermined period of time, the first programmable hardware device determines that the second programmable hardware device needs the valid firmware image.

8. The method of claim 1, wherein determining whether the second programmable hardware device needs the valid firmware image further comprises:
receiving an indication from the second programmable hardware device requesting the valid firmware image, wherein the second programmable hardware device specifies a version of the valid firmware image.

9. The method of claim 1, wherein an external memory stores multiple versions of the valid firmware image.

10. A computer-implemented method for restoring firmware, comprising:
under control of a first programmable hardware device in a server,
in response to determining that a second programmable hardware device in the server needs a valid firmware image,
retrieving a copy of the valid firmware image from a first memory; and
directly updating a second memory of the second programmable hardware device with the valid firmware image; and
under control of the second programmable hardware device,
in response to the second memory being updated, restoring existing firmware using the valid firmware image; and
in response to determining that the first programmable hardware device needs a valid firmware image,
retrieving a copy of the valid firmware image from the second memory; and
directly updating the first memory of the first programmable hardware device with the valid firmware image.

11. The method of claim 10, wherein directly updating the second memory comprises using a utility that comprises a Joint Test Action Group (JTAG) interface.

12. A computer program product comprising a computer-readable storage medium including a computer readable program, wherein the computer readable program when executed by a processor of a server causes operations comprising:
under control of a first programmable hardware device in the server,
periodically determining whether a second programmable hardware device in the server needs a valid firmware image; and
in response to determining that the second programmable hardware device needs the valid firmware image,
retrieving a copy of the valid firmware image for the second programmable hardware device; and
sending the valid firmware image to the second programmable hardware device via a private communication link, wherein the private communication link enables private communication between the first programmable hardware device and the second programmable hardware device; and
under control of the second programmable hardware device,
in response to receiving the valid firmware image from the first programmable storage device, restoring existing firmware using the valid firmware image;
periodically determining whether the first programmable hardware device needs a valid firmware image; and
in response to determining that the first programmable hardware device needs the valid firmware image,
retrieving a copy of the valid firmware image for the first programmable hardware device; and
sending the valid firmware image to the first programmable hardware device via the private communication link.

13. The computer program product of claim 12, wherein the first programmable hardware device retrieves the valid firmware image from an external memory that is dedicated to the first programmable hardware device.

14. The computer program product of claim 12, wherein the first programmable hardware device and the second programmable hardware device share an external memory storing the valid firmware image.

15. The computer program product of claim 12, wherein the second programmable hardware device retrieves the valid firmware image from an external memory that is dedicated to the second programmable hardware device.

16. The computer program product of claim 12, wherein the first programmable hardware device and the second programmable hardware device are redundant and use a same firmware.

17. The computer program product of claim 12, wherein the first programmable hardware device and the second programmable hardware device are not redundant and use different firmware.

18. The computer program product of claim 12, wherein, when determining whether the second programmable hardware device needs the valid firmware image, the computer readable program when executed:
   uses a heartbeat function to periodically send a heartbeat function message to the second programmable hardware device to determine whether the second programmable hardware device is functioning, wherein, when the second programmable hardware device does not respond to the heartbeat function message from the first programmable hardware device within a predetermined period of time, the first programmable hardware device determines that the second programmable hardware device needs the valid firmware image.

19. The computer program product of claim 12, wherein, when determining whether the second programmable hardware device needs the valid firmware image, the computer readable program when executed:
   receives an indication from the second programmable hardware device requesting the valid firmware image, wherein the second programmable hardware device specifies a version of the valid firmware image.

20. The computer program product of claim 12, wherein an external memory stores multiple versions of the valid firmware image.

21. A computer program product comprising a computer-readable storage medium including a computer readable program, wherein the computer readable program when executed by a processor of a server causes operations comprising:
   under control of a first programmable hardware device in a server,
      in response to determining that a second programmable hardware device in the server needs a valid firmware image,
         retrieving a copy of the valid firmware image from a first memory; and
         directly updating a second memory of the second programmable hardware device with the valid firmware image; and
   under control of the second programmable hardware device,
      in response to the second memory being updated, restoring existing firmware using the valid firmware image; and
      in response to determining that the first programmable hardware device needs a valid firmware image,
         retrieving a copy of the valid firmware image from the second memory; and
         directly updating the first memory of the first programmable hardware device with the valid firmware image.

22. The computer program product of claim 21, wherein directly updating the second memory comprises using a utility that comprises a Joint Test Action Group (JTAG) interface, utility that comprises a Joint Test Action Group (JTAG) interface.

* * * * *